(12) United States Patent
Murakowski

(10) Patent No.: US 12,176,957 B2
(45) Date of Patent: Dec. 24, 2024

(54) DISTRIBUTION OF OPTICAL LOCAL-OSCILLATOR COMB FOR SPECTRAL CHANNELIZING OF RF SIGNAL

(71) Applicant: Phase Sensitive Innovations, Inc., Newark, DE (US)

(72) Inventor: Janusz Murakowski, Bear, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 0 days.

(21) Appl. No.: 17/975,396

(22) Filed: Oct. 27, 2022

(65) Prior Publication Data

US 2023/0128701 A1 Apr. 27, 2023

Related U.S. Application Data

(60) Provisional application No. 63/272,457, filed on Oct. 27, 2021.

(51) Int. Cl.
*H04B 10/00* (2013.01)
*H04B 10/61* (2013.01)

(52) U.S. Cl.
CPC ... *H04B 10/6164* (2013.01); *H04B 2210/006* (2013.01)

(58) Field of Classification Search
CPC .......... H04B 10/6164; H04B 2210/006; H04B 10/11
See application file for complete search history.

(56) References Cited

U.S. PATENT DOCUMENTS

| 9,800,346 | B2* | 10/2017 | Schuetz | H04B 10/5165 |
| 11,051,089 | B1* | 6/2021 | Nikolov | H04B 10/2575 |
| 11,102,426 | B1* | 8/2021 | Kendrick | H04N 23/56 |
| 11,212,010 | B2* | 12/2021 | Uyeno | H04B 1/16 |
| 11,283,169 | B2* | 3/2022 | Uyeno | G01S 13/89 |
| 11,564,020 | B1* | 1/2023 | Xu | H04Q 11/0005 |
| 11,664,905 | B2* | 5/2023 | Uyeno | H04B 1/16 |
| | | | | 359/279 |
| 2011/0038631 | A1* | 2/2011 | Doerr | G02B 6/126 |
| | | | | 385/37 |
| 2013/0177027 | A1* | 7/2013 | Rasras | H04J 14/06 |
| | | | | 370/464 |
| 2014/0064734 | A1* | 3/2014 | Witzens | H04B 10/6164 |
| | | | | 398/79 |
| 2015/0229438 | A1* | 8/2015 | Le Taillandier De Gabory ......... |
| | | | | H04J 14/02 |
| | | | | 398/182 |
| 2021/0266063 | A1* | 8/2021 | Fermann | H04J 14/0227 |

(Continued)

*Primary Examiner* — Agustin Bello
(74) *Attorney, Agent, or Firm* — Muir Patent Law, PLLC

(57) ABSTRACT

A method and an apparatus are described that split a broadband optical signal into a plurality of narrow-band portions. Each of said narrow-band portions is combined in the same optical channel with an optical local oscillator (OLO). Furthermore, the OLO is spectrally separate from, or non-overlapping with, the corresponding narrow-band portion of the signal in the same channel. This functionality is achieved by launching the broadband optical signal and a local oscillator optical comb (LOOC) into separate waveguides at the input star coupler of an arrayed-waveguide grating. The waveguides of the output star coupler carry the narrow-band portions of the broadband optical signal along with the respective non-overlapping spectral lines of the OLO.

14 Claims, 17 Drawing Sheets

(56) References Cited

U.S. PATENT DOCUMENTS

| | | | |
|---|---|---|---|
| 2023/0086455 A1* | 3/2023 | Liu | H04B 10/293 |
| 2023/0128701 A1* | 4/2023 | Murakowski | H04B 10/6164 |
| | | | 398/202 |
| 2023/0283383 A1* | 9/2023 | Yoo | H04B 10/63 |
| | | | 398/115 |

* cited by examiner

DISTRIBUTION OF OPTICAL LOCAL-OSCILLATOR COMB FOR SPECTRAL CHANNELIZING OF RF SIGNAL

RELATED APPLICATIONS

This application is a non-provisional application of Provisional Application No. 63/272,457 filed Oct. 27, 2021, the entire contents of which are hereby incorporated by reference.

TECHNICAL FIELD

This disclosure relates generally to broadband communication (wireless communications for example), and, in particular embodiments relating to spectral channelizing and/or decomposition of received signals.

BACKGROUND

An imaging receiver, such as that disclosed in U.S. Pat. No. 9,800,346 (herein incorporated by reference in its entirety), includes a plurality of antennas that capture an RF electromagnetic wave to generate RF electrical signals which are then upconverted to the optical domain. For each RF electrical signal, an optical beam is modulated with the RF signal using an electro-optic (EO) modulator, thereby generating optical modulation sidebands that contain the information carried by the received RF signal, including phase and amplitude (variation) of the latter. As a result, the bandwidth of the received RF wave/signal may be preserved in the optical domain. For example, if the antenna array captures the RF frequency range from 20 GHz to 40 GHz, i.e., the bandwidth of the received signal is 20 GHz, then the bandwidth of the optical sideband may be 20 GHz as well.

Spatial optical processing may optionally be performed, as described in U.S. Pat. No. 9,800,346. The optical signal may be converted back to electrical domain for subsequent processing that may include the analog-to-digital conversion (ADC) and additional analysis. To this end, a modulation sideband may be mixed with an optical local oscillator (OLO) on a suitable photo-detector. To preserve the information contained in the sideband, the optical-to-electrical conversion may have to preserve the bandwidth of the former. Therefore, the bandwidth of the resulting electrical signal may be the same as the bandwidth of the optical modulation sideband, or 20 GHz for the above example. Therefore, the photo-detector may have to respond to frequencies at least as high as the bandwidth, and the ADC sampling rate may have to be at least twice the highest frequency to satisfy the Nyquist criterion. The high sampling rate of the ADC may pose a challenge as the effective number of bits (ENOB) of the ADC generally may go down as the sampling frequency increases.

SUMMARY

To recover with high fidelity the information contained in modulation sidebands, the broadband modulation sideband signal may first be divided into narrow-band chunks, or portions, for detection and subsequent processing. Each of the narrow-band chunks may then be mixed with a respective OLO where, for unambiguous signal recovery, the OLO may be spectrally non-overlapping with the respective narrow-band portion. In some applications, it may be preferable to simultaneously process multiple narrow-band channels in parallel, rather than a single wide-band channel. As a result, improved signal-to-noise ratio and/or high ENOB in the ADC may be obtained for better fidelity of the recovered signals. Embodiments disclosed herein relate to electro-optic processing of a modulation sideband that may divide a wideband signal into several narrow-band chunks. These narrow-band spectral chunks may be simultaneously mixed with respective optical local oscillator (OLO) spectral lines on photo-detectors to produce channelized outputs at an intermediate frequency (IF) in the electrical domain for subsequent processing.

DETAILED DESCRIPTION

Figure 1:
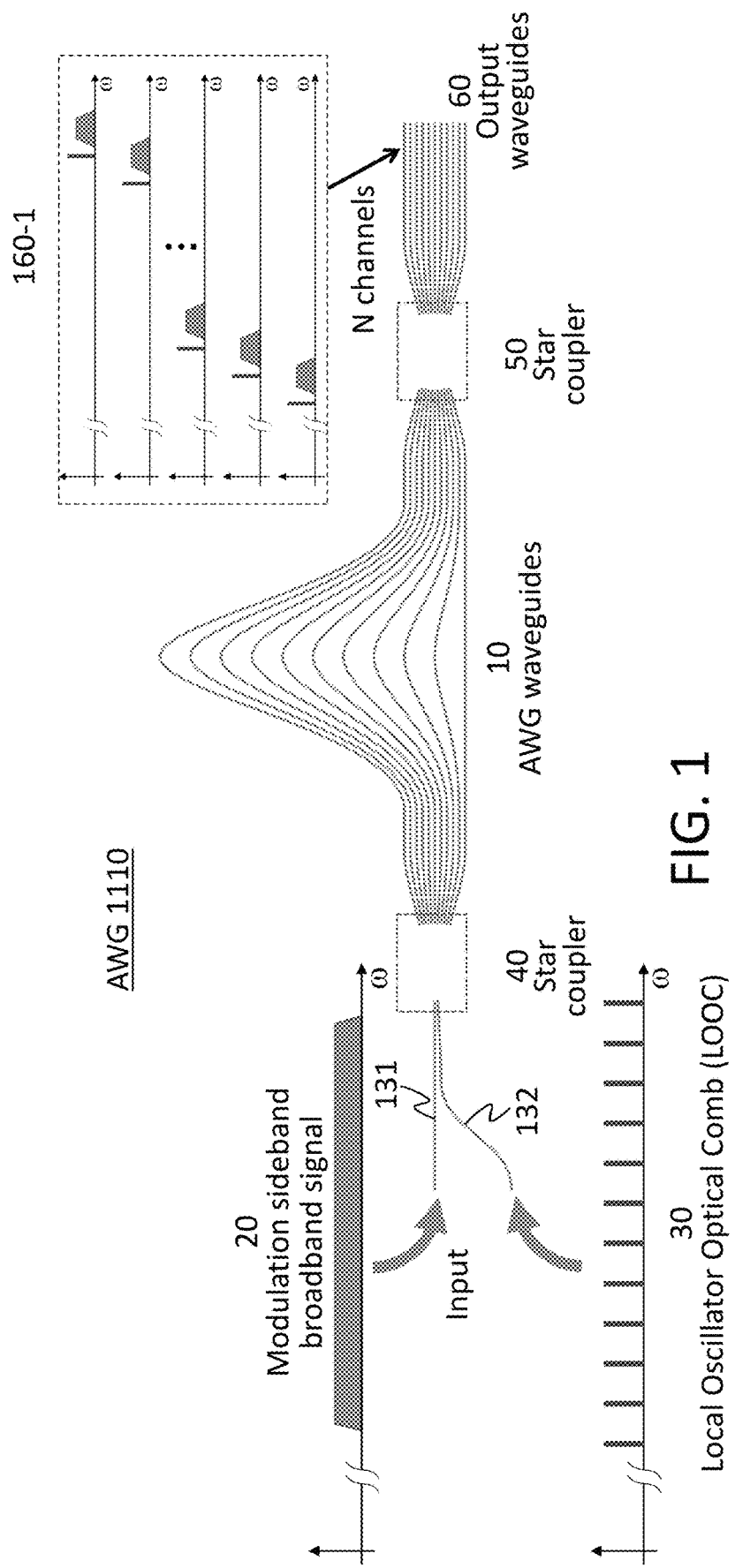
FIG. 1 is a diagram of one embodiment of the present invention where a broadband signal is split into narrow-band chunks on output channels that include a corresponding optical local oscillator in each output.

The present disclosure now will be described more fully hereinafter with reference to the accompanying drawings, in which various exemplary implementations are shown. The invention may, however, be embodied in many different forms and should not be construed as limited to the exemplary implementations set forth herein. These exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

Like numbers refer to like elements throughout. Reference numeral suffixes may be used to identify similar elements, such as to distinguish between individual ones of identical elements or to denote specific or alternative implementations of an element. Suffixes may also be used to generically refer to any one of a group of similar elements. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Though the different figures show variations of exemplary implementations, these figures are not necessarily intended to be mutually exclusive from each other. Rather, as will be seen from the context of the detailed description below, certain features depicted and described in different figures will be understood to be used with other features illustrated in other figures to result in various exemplary implementations.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Components described as being "electrically connected" (or "optically connected") are configured such that an electrical signal (or optical signal) can be transferred from one component to the other (although such signal may be attenuated in strength as it is transferred, may be selectively transferred, may be transferred through duplication or splitting, and may be transferred when combined with other signals (e.g., as a component of a composite signal)).

Figure 2:
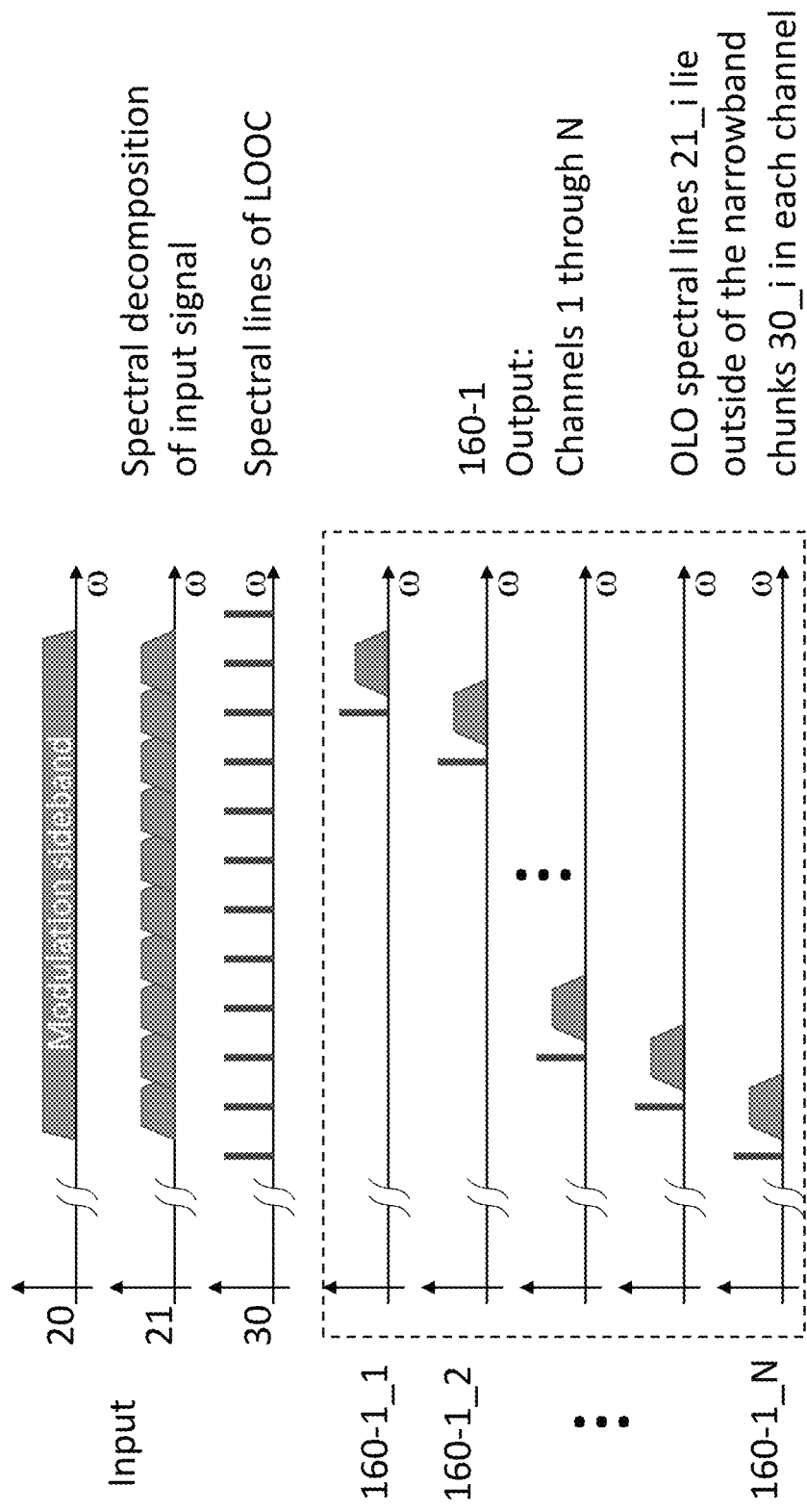
FIG. 2 shows optical signals in frequency domain corresponding to the configuration of FIG. 1.

FIG. 1 shows a schematic diagram of the local oscillator optical comb (LOOC) distribution system for processing of a spectrally-split broadband signal, with FIG. 2 showing further details of the optical signals as they propagate through the system. The operation of the system may be best understood by first analyzing a conventional arrayed waveguide grating (AWG) in a conventional configuration that employs a single optical input.

Figure 3:
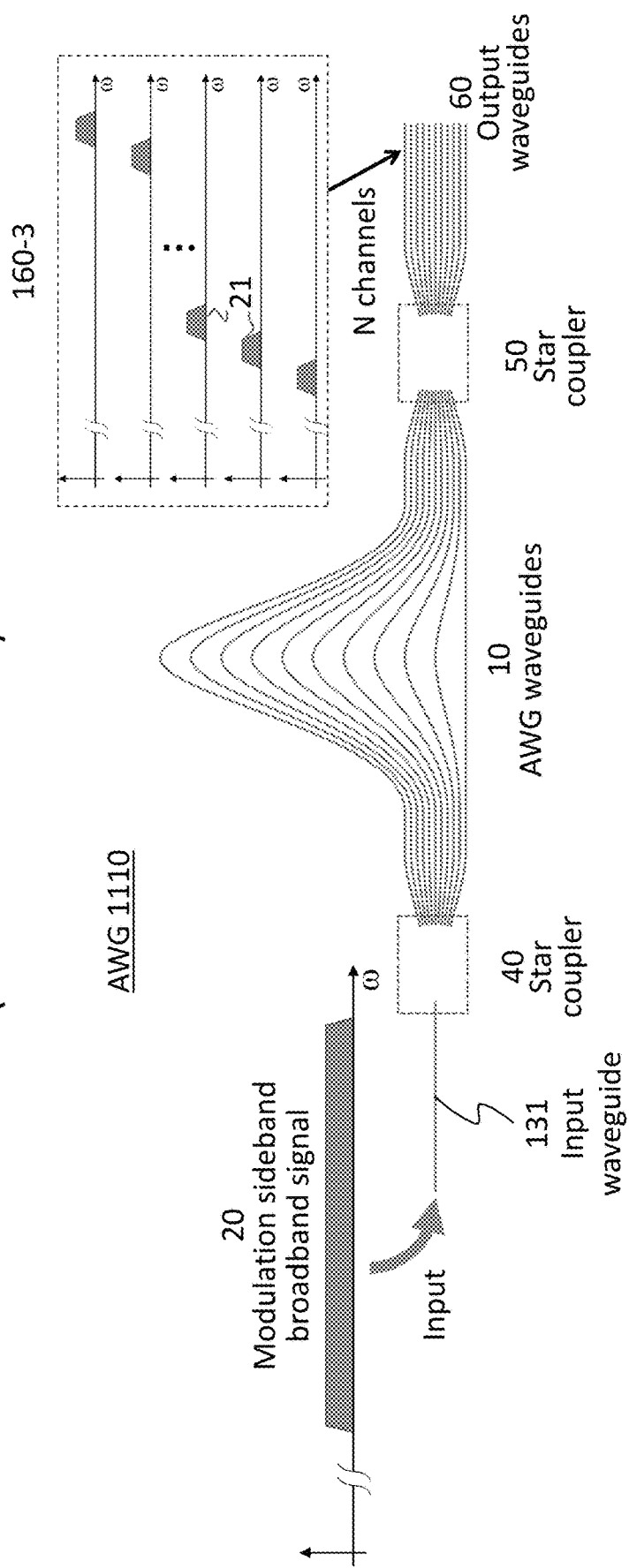
FIG. 3 shows an AWG with a single input waveguide and broadband signal at the input that is spectrally split at the output.
Figure 14B:
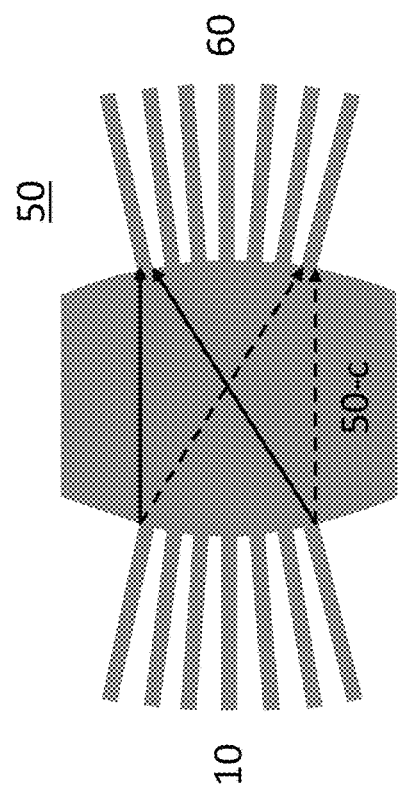
FIGS. 14A and 14B illustrate exemplary details of star couplers.
Figure 14A:
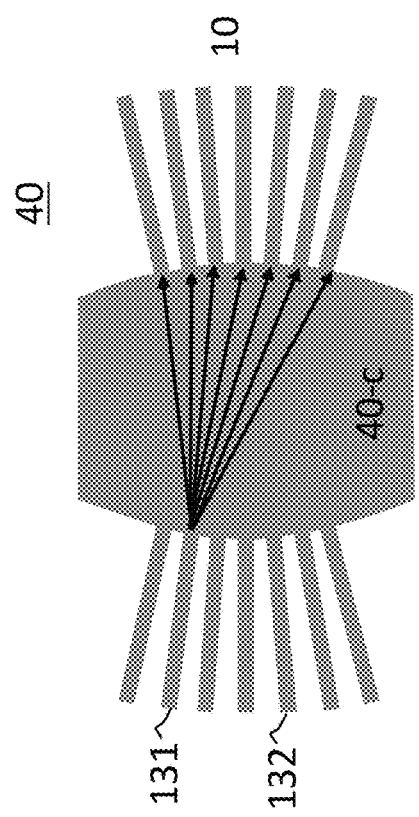

As shown in FIG. 3, an AWG may be used to divide a broadband optical signal into multiple narrow-band portions (which also may be referred to herein as narrow-band chunks). To this end, broadband optical signal 20 enters a single input waveguide 131 from the left as shown in FIG. 3. Waveguide 131 couples into star coupler 40 that splits the input broadband optical signal 20 among several waveguides 10 (having their inputs at the output of star coupler 40). FIG. 14A illustrates an example of star coupler 40, showing an optical signal input on waveguide 131 diverging in propagation space 40-*c* to be input into waveguides 10. The black arrows from the end of waveguide 131 at propagation space 40-*c* show the divergence of the optical beam carried by waveguide 131 in propagation space 40-*c*. It should be appreciated that the different lengths of these black arrows show that optical path length offsets may be introduced to each optical path from the end of waveguide 131 with respect to each AWG waveguide 10. Such optical path length offsets may provide a corresponding incremental linear phase offset (in addition to that provided by the AWG waveguides 10) that corresponds to the input location at propagation space 40-*c*, such that different input locations at propagation space 40-*c* (e.g., corresponding to the different input waveguides of star coupler 40 of FIG. 14A) provide different incremental linear phase offsets resulting in different shifts of the same optical signal at the output of star coupler 50. Star coupler 40 may thus be considered an optical splitter, splitting the optical signal 20 into the multiple split signals that are individually captured by waveguides 10. Propagation space of a star coupler (e.g., 40-*c*) may be a space where the optical beams transmitted thereto by waveguides (e.g., 131, 132) are no longer guided by these waveguides. The waveguides 10 of the arrayed waveguide grating (AWG) may have different lengths, as schematically shown in FIG. 3, and as such may provide different delays for signal 20 propagating through each waveguide 10. At the respective outputs of the AWG waveguides 10 (which are then provided as inputs to star coupler 50), a wavelength/frequency dependent linear phase offset may thus be introduced to the broadband optical signal 20 at the input of star coupler 50.

More specifically, linear phase offsets of different degrees may be introduced for the different frequency components of the broadband optical signal 20 at the input to star coupler 50. The linear phase offset of a component of the optical signal 20 (e.g., of a particular wavelength) at the input of star coupler 50 (at the termination of the waveguides 10 at propagation space 50-*c* as shown in FIG. 14B) determines the direction of the resulting wavefront of that optical signal component (e.g., a converging spherical wavefront formed by the combination of individual diverging spherical wavefronts formed from each output of waveguides 10) in the propagation space 50-*c* (an interference space) of the star coupler 50 formed between its inputs and outputs. The degree of this linear phase offset at the input of the star coupler 50 (which also may be referred to as the slope of the linear phase offset) differs depending on the wavelength of the optical signal component, resulting in different propagation directions of the wavefront for the different components (at different wavelengths) of the optical signal 20, and thus resulting in the different locations at which the components of the optical signal 20 are focused at the output of the star coupler 50. Thus, in dependence of their wavelengths/frequency, the components of the optical signal 20 may thus be spatially separated at the output of the star coupler 50 and captured by different ones of the output waveguides 60. FIG. 14B illustrates an example of star coupler 50 with the two solid arrows representing a particular narrowband chunk (e.g., 20_1 being focused at and captured by the uppermost one of waveguides 60 and the two dashed arrows representing a different narrowband chunk (e.g., 20_N) being focused at and captured by the lowermost one of waveguides 60. Each output waveguide 60 may capture a narrow-band chunk **20_*i* of the broadband optical signal 20, each narrow-band chunk comprising a spectrum (or frequency range) of a corresponding portion of the broad band optical signal that is directed onto and captured by an output waveguide 60 as a result of the linear phase offset introduced by the AWG waveguides 10. It should be appreciated that linear phase offsets introduced to a single narrow-band chunk of the broadband optical signal may not be constant and thus may also introduce spatial divergence of different portions of the narrow-band chunk (i.e., in dependence on wavelength/frequency differences of different portions of the narrowband chunk), but such spatial divergence may be small enough to allow capture of the different parts of the narrow-band chunk by the same waveguide 60. For example, waveguides 60 at the propagation space 50**-*c* of star coupler 50 may have a fan in configuration such that the waveguide is wider at the propagation space 50-*c* and then tapers to a narrower width in the propagation direction in order to capture a larger segment of a narrowband chunk. For example, when using a lens 51 rather than a star coupler 50, a lenslet 51-*b* paired with each of the output waveguides 60 may similarly capture different wavelength/frequency components of the narrow-band chunk 20_*i* that are focused onto the lenslet 51-*b* and provided to the same output waveguide 60.

Figure 4:
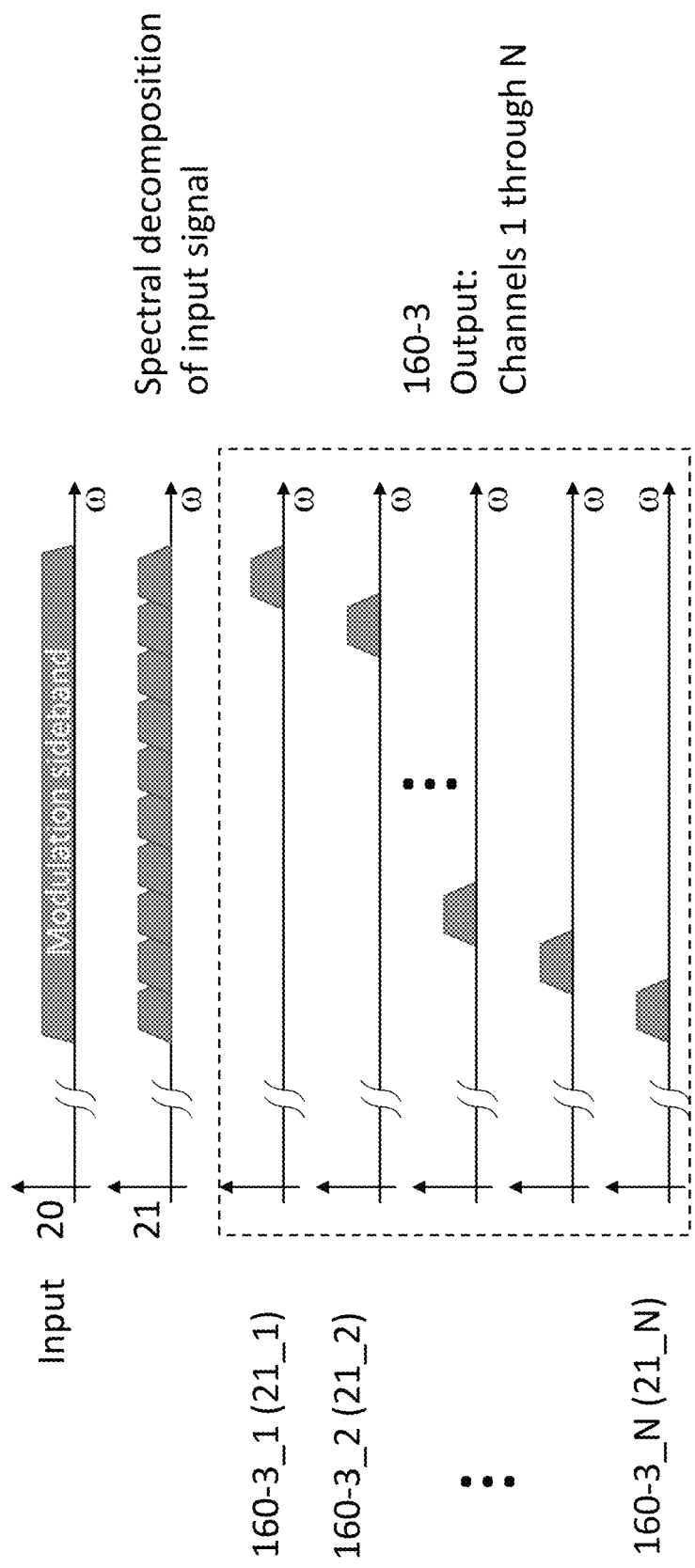
FIG. 4 illustrates how a broadband signal may be divided into narrow-band chunks by an AWG.

Thus, star coupler 50 may direct different portions of the incoming spectrum of the broadband optical signal 20 into different output waveguides 60. For an AWG where the incremental difference in time delay is identical between adjacent waveguides 10, the spectral resolution, or channel spacing, may correspond to the reciprocal of the maximum difference in time delay between peripheral waveguides whereas the free spectral range, or alias-free frequency-mapping range, may correspond to the reciprocal of the time-delay increment. As shown in FIG. 3, the broadband input signal 20 is divided into narrow-band spectral chunks 21 forming output 160-3. FIG. 4 shows additional details of the spectral decomposition of the broadband signal 20 at the input of the AWG into narrow-band chunks effected by an AWG. Therein, the broadband input signal 20 may be thought of as consisting of a plurality of (e.g., N) narrow-band chunks 21, individually separated from one another, with each narrow-band chunks 21_*i* being captured and transmitted by a respective one of output waveguides 60 to form the output of the AWG 1110. Notably, one spectral portion of the broadband input signal 20 (a narrow-band chunk of the broad band input signal 20) per output waveguide 60 appears at the output 160-3.

The output positions of the narrow-band chunks 21_*i* may be shifted at the output of the star coupler 50 by shifting the position of the input waveguide 131 at the input of the star coupler 40. For example, shifting the input waveguide 131 up in the star coupler 40 may shift the narrow-band chunks 21_*i* of the output 160-3 down, across the output waveguides 60 (with those narrow-band chunks 21_*i* shifted below the lowermost output waveguide 60 being reintroduced to the upper waveguides 60 via "wrapping"). Conversely, shifting the input waveguide 131 down in star coupler 40, may shift the narrow-band chunks 21_*i* of the output 160-3 up, across the output waveguides 60 (with a similar "wrapping" effect).

When star coupler 40 has more than two inputs (such as shown in FIG. 14A), the different positions of the input waveguides 131 and 132 may be achieved by coupling a waveguide (e.g., an optical fiber) to different waveguide inputs of star coupler 40. The remaining inputs of the star coupler 40 may be unused. Alternatively, the star coupler 40 may be designed and manufactured to have only two inputs (e.g., only waveguides identified as 131 and 132 in FIG. 14A) at desired positions with respect to their termination at propagation space 40-*a*.

Figure 14C:
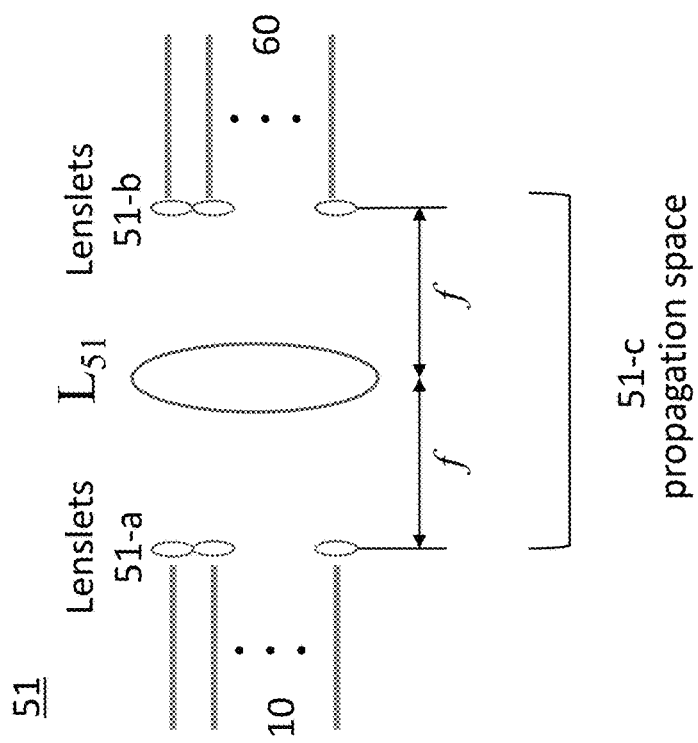
FIGS. 14C and 14D illustrate exemplary details of lenses that may be used as optical devices with the AWG according to some embodiments of the invention.
Figure 14D:
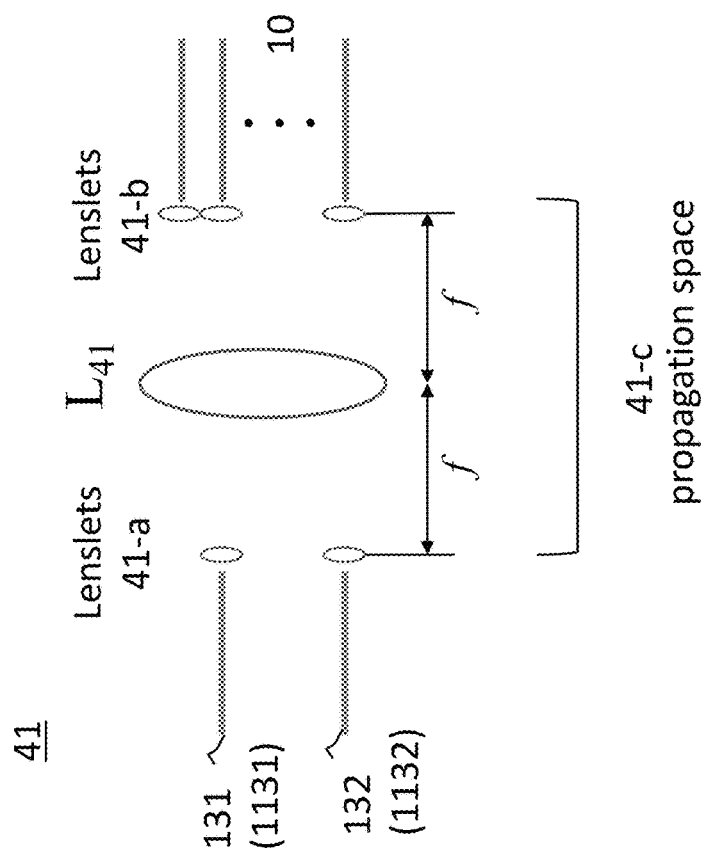

Other optical devices may be used other than star couplers. FIGS. 14C and 14D illustrate use of optical lenses 41 and 51 that may be used instead of star couplers 40 and 50. As shown, optical lenses 41, 51 comprise sets of input lenslets 41-*a*, 51-*a* and output lenslets 41-*b*, 51-*b* to couple the corresponding input and output optical waveguides. A lens $L_{41}$, $L_{51}$ (which may be a single homogenous lens or a set of the same) is provided in a propagation space 41-*c*, 51-*c*. Lens $L_{41}$, may collimate light received from each input (a lenslet 41-*a*/waveguide pair 131 or 132 pair) onto lenslets 41-*b*. Lens $L_{51}$ may focus the wavefronts (which may be planar wavefronts) of the various narrowband chunks 20_*i* onto corresponding ones of lenslets 51-*b*. The optical beams transmitted through the propagation space 41-*c* may result in the same divergence and splitting by lens 41 as described with respect to star coupler 40, and the optical beams transmitted through the propagation space 41-*c* and 51-*c* may result in the same frequency/wavelength dependent spatial separation upon being focused and captured by waveguide outputs 60 as described with respect to star coupler 50. The star couplers 40, 50 and lenses 41, 51 may perform the same discrete Fourier transform such that their outputs are the discrete Fourier transform of their inputs. It should be appreciated that other optical devices may also be used which may perform the transformation of inputs to outputs as done by the star couplers 40, 50 and lenses 41, 51.

When two waveguides are presented at the input of the star coupler 40, each of their broadband inputs may be spectrally decomposed (separated) at the output of the AWG 1110, with the respective spectral portions shifted relative to one another at the output of the AWG 1110. This situation is presented in FIG. 1 where a first input waveguide, 131, carries the broadband signal 20, whereas a second input waveguide, 132 carries a local oscillator optical comb (LOOC). As illustrated in FIG. 1, the LOOC may comprise N OLO spectral lines 30, each OLO spectral line 30_*i* comprising a coherent optical signal of a corresponding frequency (e.g., an optical frequency tone, such as that produced by a laser). The OLO spectral lines 30 may be mutually coherent and phase locked with each other. In addition, each of the OLO spectral lines 30 may be mutually coherent and phase locked with an optical carrier of the broad band optical signal 20 (e.g., as discussed elsewhere herein, an optical carrier signal that is modulated in an electro-optic modulator to from the broadband optical signal 20). Like the narrow-band chunks 21, the different OLO spectral lines 30 are spatially separated from each other by the AWG waveguides 10 (due to their different wavelengths/frequencies introducing different linear phase offsets to result in different propagation directions in star coupler 50) to be captured by separate ones of the output waveguides 60. The different positions of input waveguides 131 and 132 at the input of star coupler 40 may result in different spatial shifting of the LOOC and the narrow-band chunks 21 at the output of the star coupler 50, providing a frequency offset between each OLO spectral line 30_*i* and the center of the corresponding narrow-band chunk 21_*i* captured and transmitted by each output waveguides 60. This way, output 160-1 may comprise N pairs of an OLO spectral line 30_*i* and a corresponding narrowband chunk 21_*i* (frequency offset and spectrally separate (non overlapping in frequency/wavelength) from one another) provided in a respective output waveguide 60 as per illustration of FIG. 2. The spectral separation of the OLO spectral line 30_*i* from the respective narrowband chunk 21_*i* in the same channel of the AWG (i.e., same output waveguide 60_*i*) may allow for unambiguous recovery of the signal carried by the narrow-band chunk 21_*i* in electrical domain by mixing the two optical beams (the narrow-band chunk 21_*i* and the OLO spectral line 30_*i*) on a photo-diode. It should be appreciated that each OLO spectral line 30_*i* may be mutually coherent with the optical carrier of the narrow-band chunk 21_*i*.

The broadband optical signal 20 may comprise a modulation sideband resulting from upconverting an RF electrical signal (e.g., captured by an antenna) to an optical signal with an electro-optic modulator. The approach to combining OLO spectral lines 30 with the narrow-band chunks 21 of the broadband optical signal 20 (e.g., modulation sideband) described above may offer flexibility in the separation of the OLO spectral line 30_i from the signal spectrum. Such flexibility may be desirable as it allows for setting the fractional bandwidth of the modulated IF (intermediate frequency) signal output by the photodiodes. For example, if AWG resolution, or channel separation, is 2 GHz so that the narrow-band chunk 21_i of the modulation sideband is 2 GHz wide, and the OLO spectral lines 30 of the LOOC are at the center of the adjacent channel, then mixing of the OLO spectral line 30_i with the corresponding narrow-band chunk 21_i of the modulation sideband yields an electrical signal with a frequency between 1 GHz and 3 GHz, i.e. 3:1 fractional bandwidth. Note, however, that the entire LOOC may be continuously tuned within the 2-GHz bandwidth of the AWG channel width. For example, if the LOOC is adjusted down by 0.5 GHz from the channel center, then the resulting output bandwidth of a photodiode shifts up by 0.5 GHz to yield 1.5-to-3.5 GHz, or 7:3 fractional bandwidth, which is smaller than 3:1.

However, there is a limit as to how far the spectrum of the LOOC may be continuously shifted. Using the numbers of the example above, a 2-GHz shift of the LOOC yields the same LOOC since the comb is spectrally periodic in the bandwidth of interest. This means that shifting the LOOC down from the channel-center by 1 GHz is equivalent to shifting it up by the same amount. As a result, an octave, or 2:1 fractional bandwidth, may be difficult to achieve by spectrally tuning the LOOC.

Figure 5:
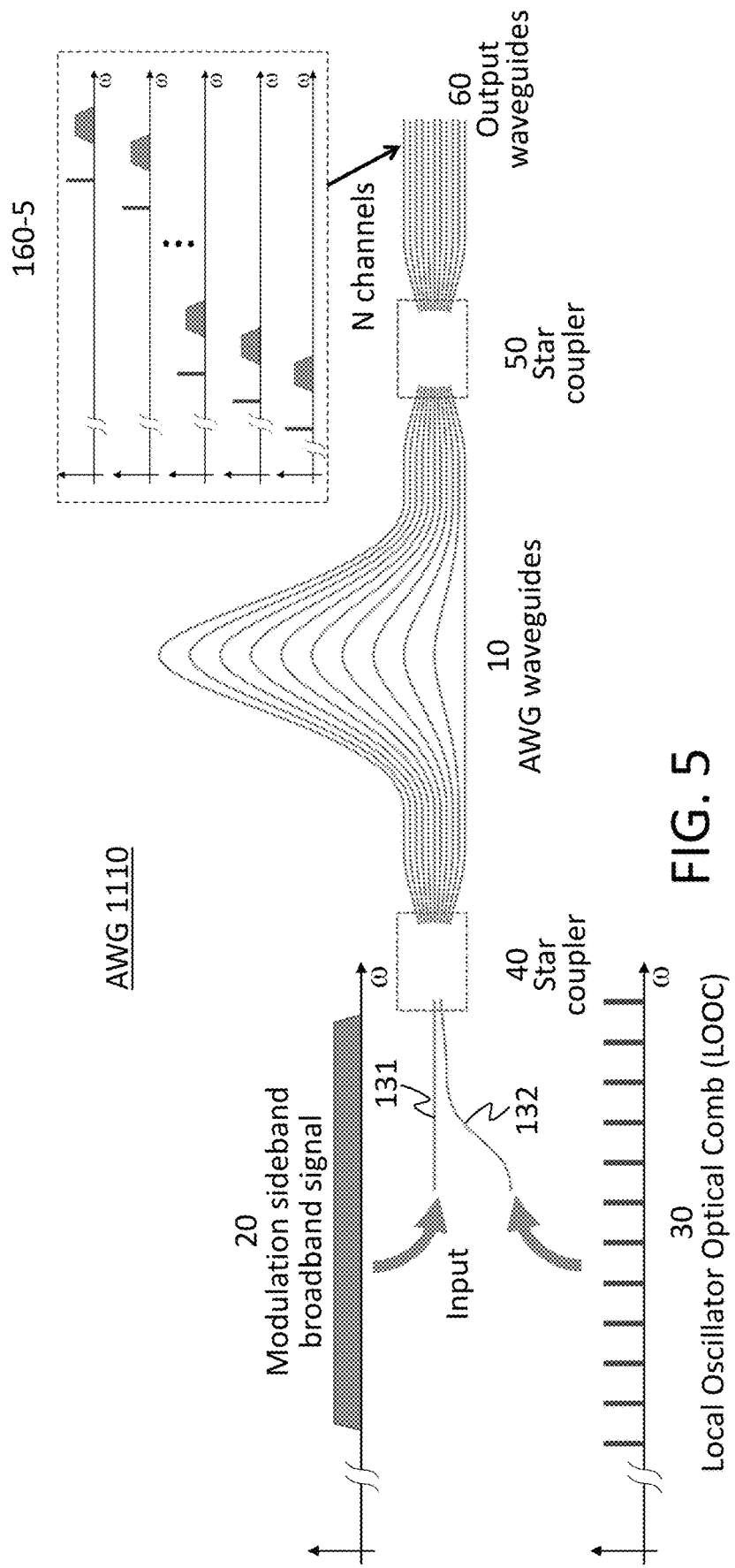
FIG. 5 shows an AWG with two separate inputs for the broadband signal and LOOC with the input waveguides more widely separated at the input star coupler as compared to FIG. 1.
Figure 6:
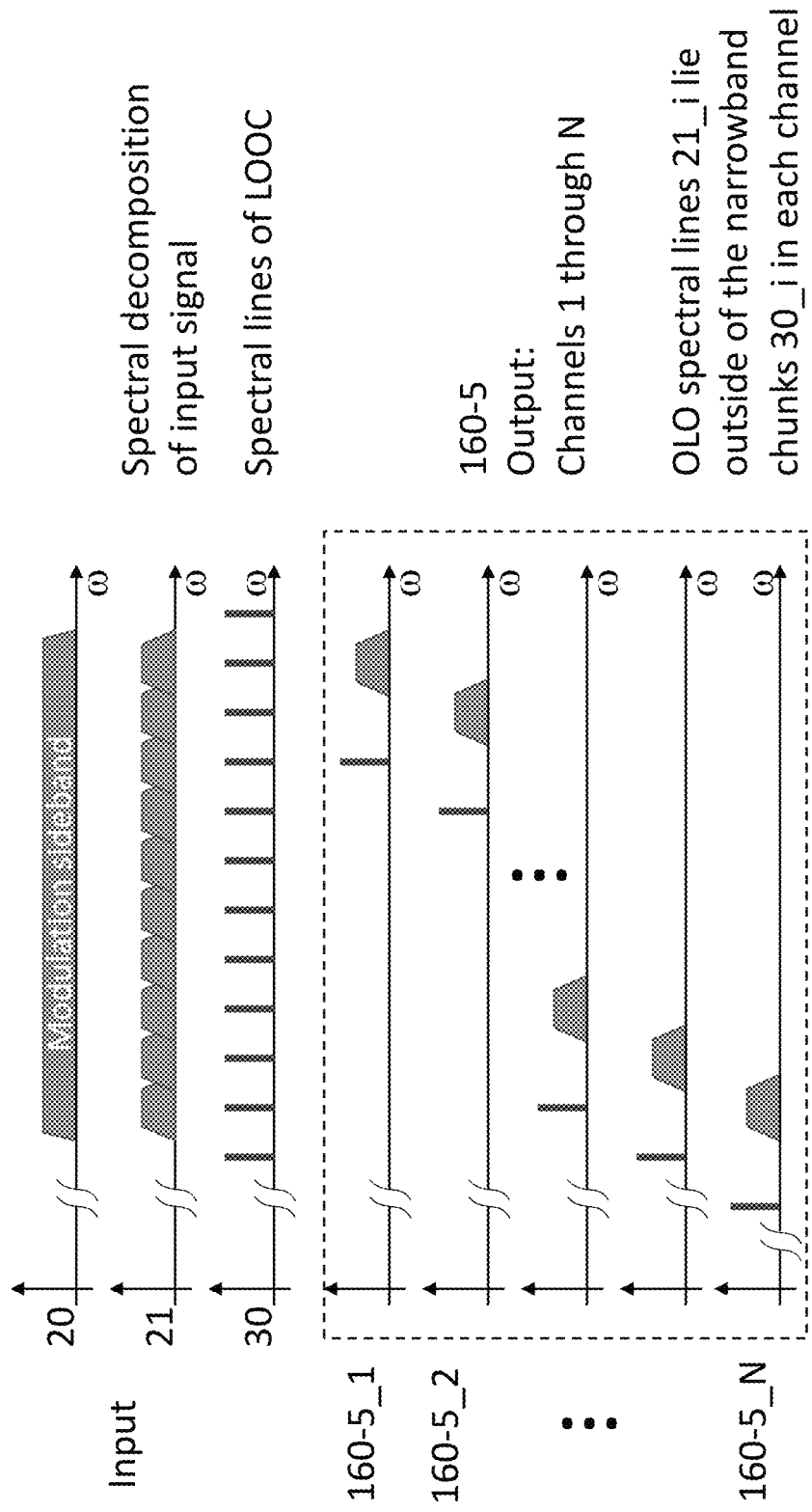
FIG. 6 shows optical signals in frequency domain corresponding to configuration of FIG. 5.

To reduce the fractional bandwidth of the photodiode output below an octave, one may increase the separation between the AWG input waveguides that carry the modulation sideband (optical broadband signal 20) and the LOOC. FIG. 5 shows such a configuration where the separation between the input waveguides 131 and 132 is double of the corresponding separation between waveguides 131 and 132 in FIG. 1. The increased separation between the input waveguides increases the frequency shift (or frequency offset) between the spectra captured by the output waveguides (i.e., the frequency offset between each narrow-band chunk 21_i and the corresponding OLO spectral line 30_i in each waveguide 60 is increased). Assuming that the OLO spectral lines 30 of the LOOC fall at the centers of the AWG channels, the signal processing of this configuration is presented in FIG. 6. Note that in each channel of the output 160-5, the spectral separation between the OLO spectral line 30_i and the narrow-band portion 21_i of the modulation sideband 20 is increased compared the channels of output 160-1 of FIG. 2. As a result, the fractional bandwidth of the photodiode output is reduced. Using numbers of the above example, this bandwidth is from 3 GHz to 5 GHz, or 5:3 fractional bandwidth, which is less than an octave. Increasing the separation between the input waveguides by a factor of three, may accordingly shift the photodiode output bandwidth to 5-7 GHz, or 7:5 fractional bandwidth, etc. As before, there may be additional continuous tunability of the output bandwidth by means of shifting the LOOC spectrum.

In addition, the continuous tuning of the output spectrum may be achieved at the time of device fabrication by the relative placement of the input waveguides 131 and 132 that carry the modulation sideband and the LOOC. In this case, choosing the waveguide separation by a fraction of the separation that corresponds to a spectral shift by an integer multiple of channel spacing may yield the arbitrary (fractional) tuning of the photodiode output bandwidth. For example, the separation between input waveguides by 2.5 times the 'adjacent' separation of FIG. 1 may yield the photodiode output bandwidth of 4-6 GHz, or 3:2 fractional bandwidth, whereas 1.5 times would yield 2-4 GHz or an octave, assuming that LOOC is adjusted so that its spectral lines 30, or teeth, fall in the middle of the AWG channels.

Figure 7:
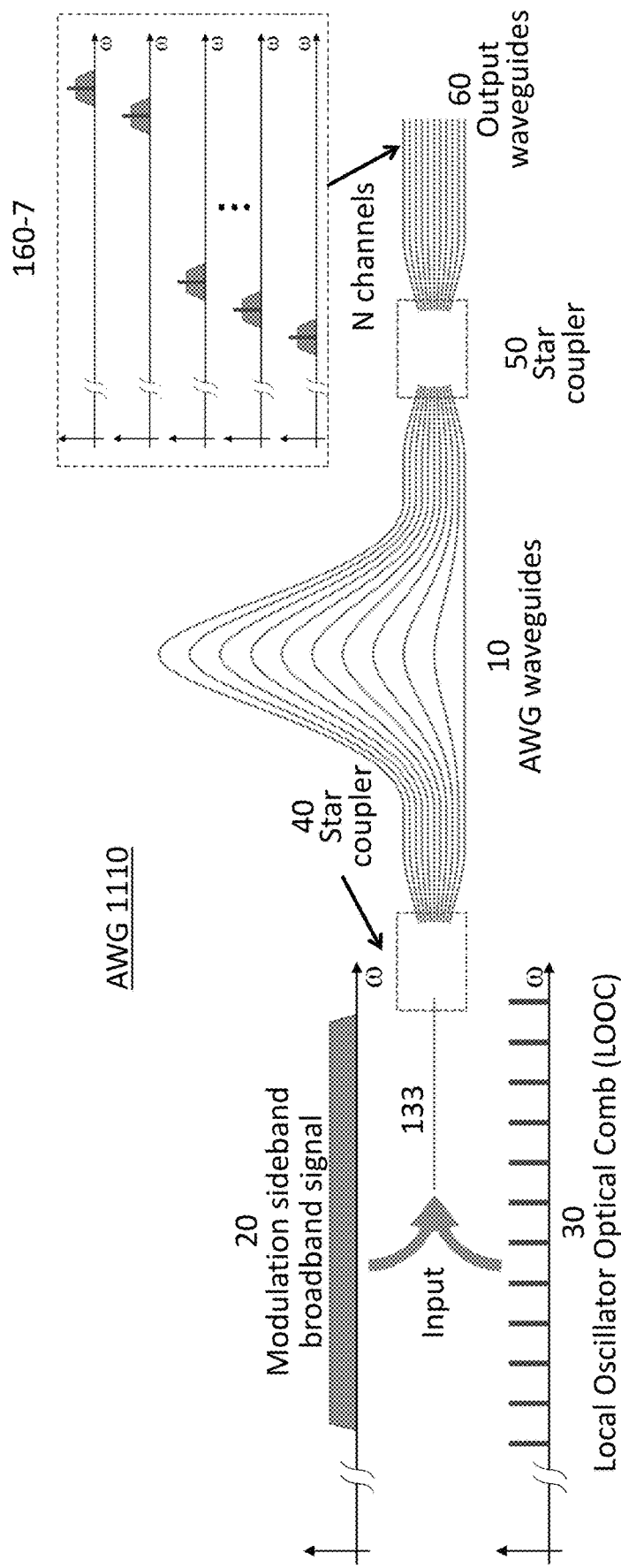
FIG. 7 shows an AWG with broadband signal and LOOC provided by a single input waveguide.
Figure 8:
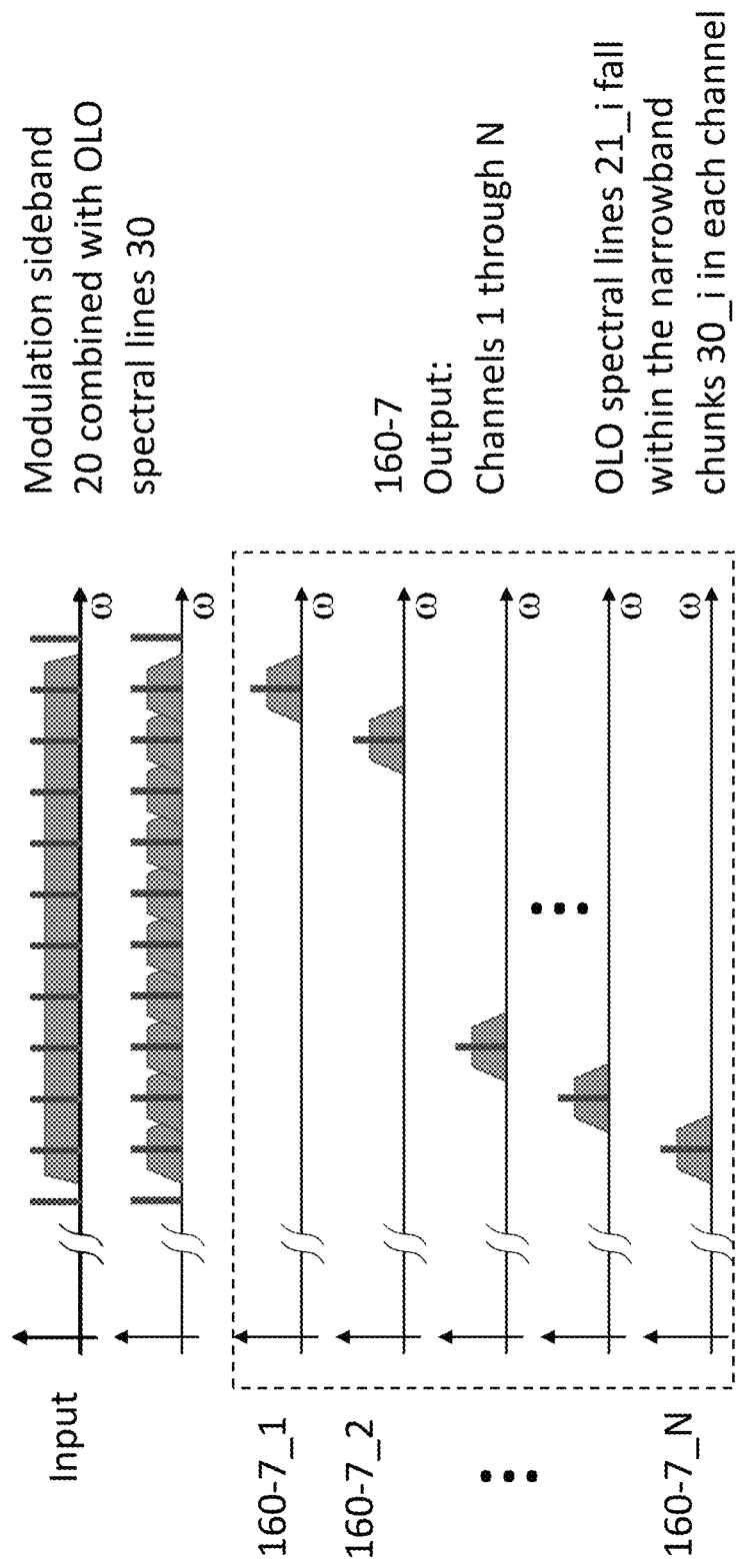
FIG. 8 shows optical signals in frequency domain corresponding to the configuration of FIG. 7.

On the other hand, a single input waveguide may be used to carry the broadband modulation sideband 20 and the LOOC to star coupler 40, such as shown with input waveguide 133 in FIG. 7. In this configuration, the AWG 10 splits both the broadband modulation sideband 20 to narrow-band chunks 21 and the LOOC to OLO spectral lines 30, and directs them into the corresponding output waveguides 60 as combinations 160-7_1 through 160-7_N as shown in FIG. 8. Note that each narrow-band chunk 21_i of the modulation sideband 20 has a corresponding OLO spectral line 30_i in the same channel. However, note also that the frequency of the OLO spectral line 30_i falls within the spectral band (frequency band) of the narrow-band chunk 21_i. As a result, when such a combination is mixed on a photo-diode, ambiguity may arise and information may be lost since $|\omega_{OLO}-\omega_s|=|\omega_s-\omega_{OLO}|$, where $\omega_s$ is the signal frequency of the narrow-band chunk 21_i and $\omega_{OLO}$ is the frequency of the OLO spectral line 30_i. This is because the portion of the spectrum above OLO spectral line 30_i maps to the same frequency at the photo-diode output as the portion of the spectrum below the OLO spectral line 30_i. For this reason, it may be preferable to have the OLO spectral line 30_i outside of the narrow-band chunk 21_i of the optical modulation sideband 20 as previously illustrated in FIG. 2.

Figure 9:
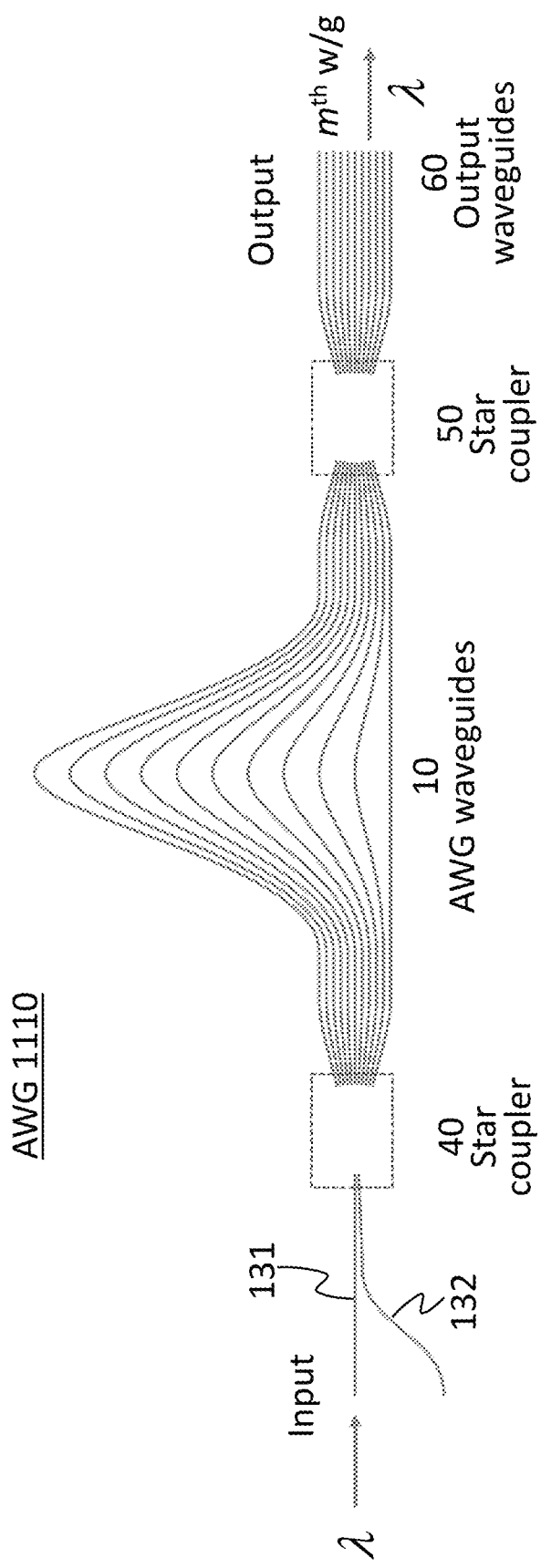
FIG. 9 shows an AWG with an input entering through the central waveguide of a star coupler and exiting through $m^{th}$ output waveguide.
Figure 10:
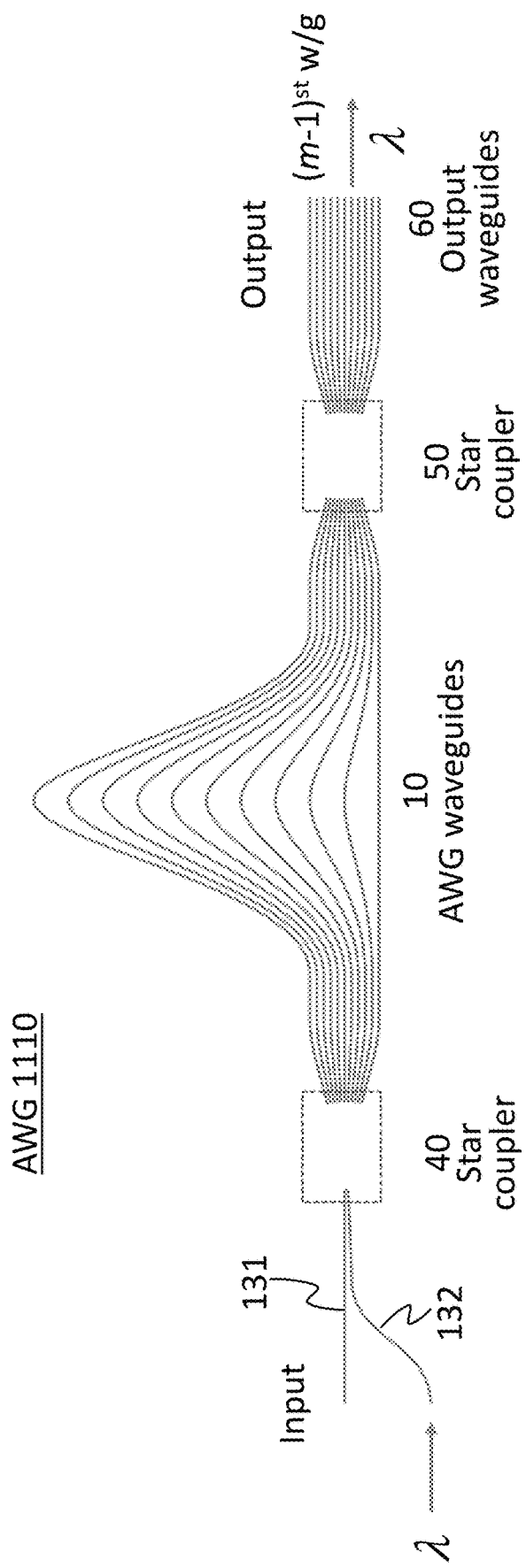
FIG. 10 shows an AWG with an input entering through a waveguide shifted down with respect to the center and exiting through $(m-1)^{st}$ output waveguide.

Some embodiments of the present invention provide the means for such a spectral separation between the OLO spectral line 30_i and the corresponding narrow-band chunk 21_i of the modulation sideband 20, both traveling in the same output waveguide. To this end concepts and methods described in U.S. application Ser. No. 17/894,072, filed Aug. 23, 2022 which is hereby incorporated by reference in its entirety, may be employed. In particular, note that if the input waveguide to a star coupler of an AWG is shifted laterally, then so may be the spectrum in the output waveguides 60. For example, referring to FIGS. 9 and 10, assume that a centrally positioned input waveguide 131 yields wavelength λ (or frequency ω) in the $m^{th}$ output waveguide 60, as in FIG. 9. Then, shifting the input down, i.e., using input waveguide 132, may yield the same wavelength λ in $(m-1)^{st}$ output waveguide 60, as shown in FIG. 10. Further shifting the input down may yield the same wavelength λ in $(m-2)^{nd}$ output waveguide. In other words, the position of the input waveguide at the input of star coupler 40 may determine the distribution of wavelengths (frequencies) in the output waveguides 60. Put differently, the position of the input waveguide at the input of star coupler 40 may determine the wavelengths (frequencies) of the optical signal of the input waveguide that are captured by each of the output waveguides 60. Therefore, if two input waveguides are used to provide inputs to AWG 1110, each output waveguide 60 may contain different portions of the spectrum from the two inputs with a frequency offset being a function of the spatial separation of the two inputs at the input of the star coupler 40. This phenomenon of shifting the output spectrum depending on the position of the input waveguide is exploited here to combine non-overlapping spectra of the OLO spectral line 30_i and the narrow-band portion 21_i of the modulation sideband.

Figure 11:
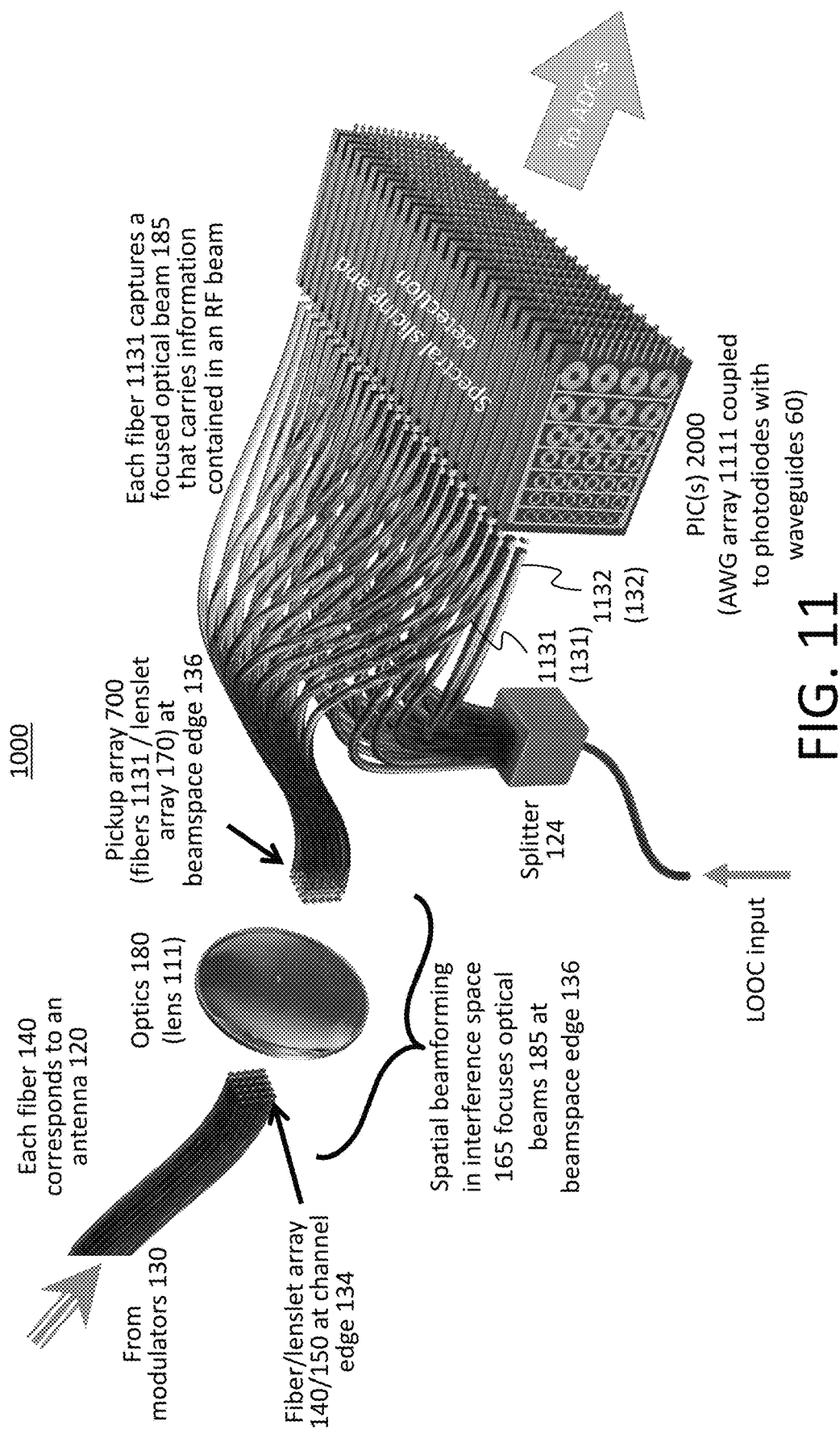
FIGS. 11 and 12A-12C shows an example implementation an imaging receiver with spatial-spectral channeling according to an embodiment of the invention.
Figure 12A:
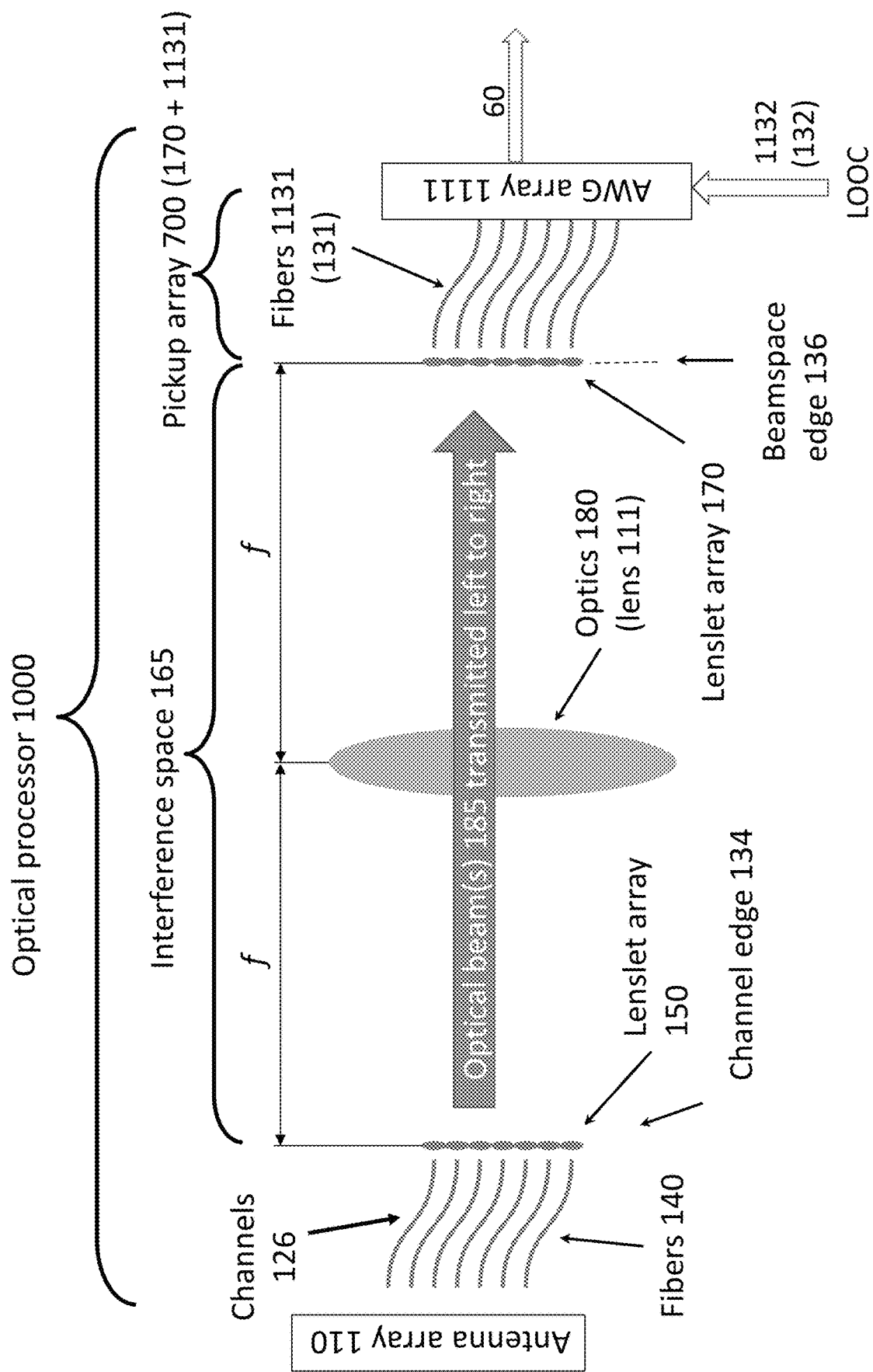
Figure 12B:
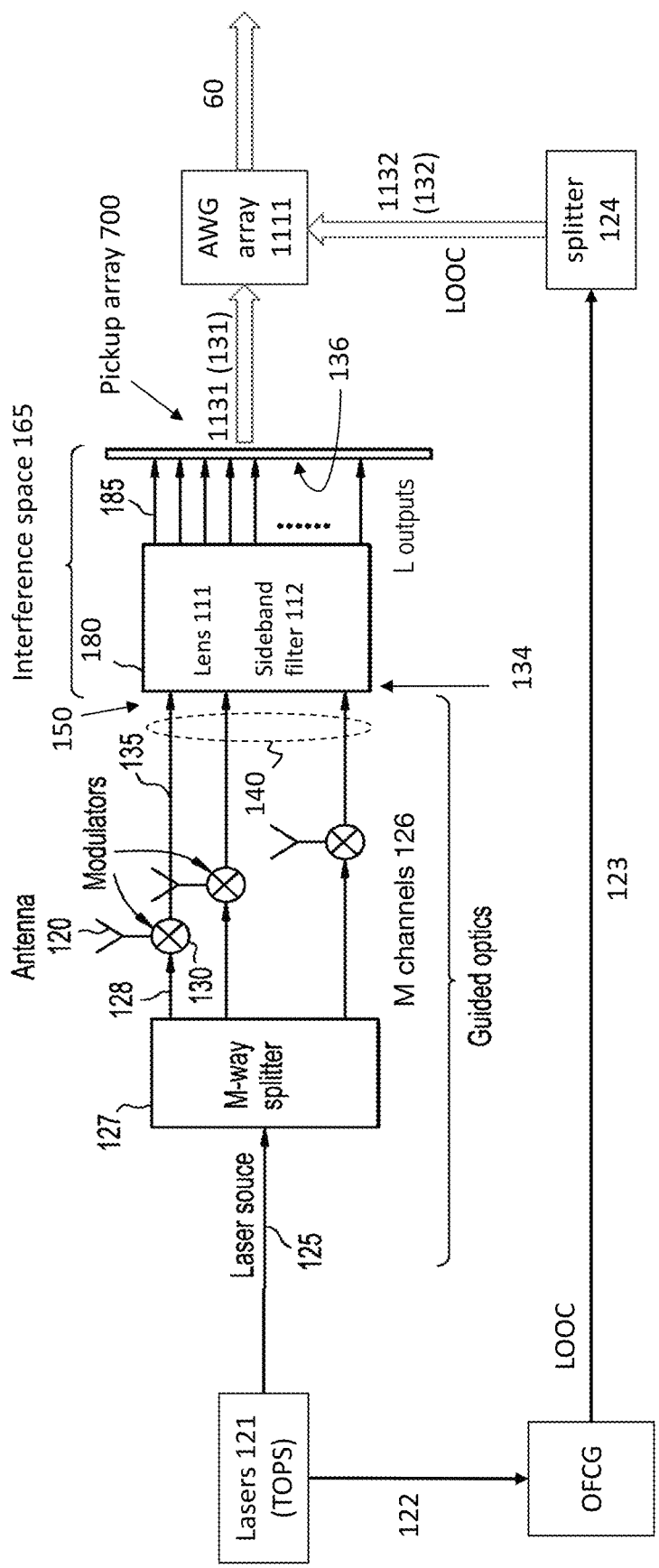
Figure 12C:
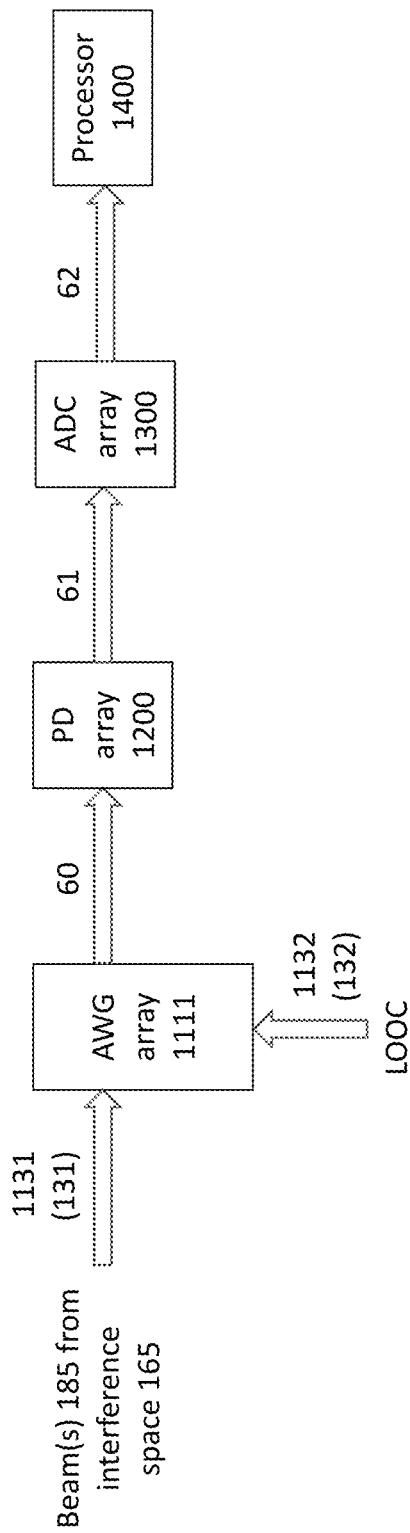

FIG. 11 illustrates an imaging receiver according to an embodiment of the invention, which may implement the structure and/or operation of the imaging receiver disclosed in U.S. Pat. No. 9,800,346 and/or U.S. Patent Publication 2021/0257729 (herein incorporated by reference in its entirety) as modified to incorporate the use of the LOOC to provide optical local oscillators as described herein. FIGS. 12A, 12B and 12C illustrate further exemplary details of the imaging receiver of FIG. 11. It should be appreciated FIGS. 11, 12A, 12B and 12C may illustrate different structure of the imaging receiver that may be absent in others ones of these figures. Referring to FIG. 11, a lens 111 in combination with fiber/lenslet arrays may perform spatial RF beam forming in optical domain as described in U.S. Pat. No. 9,800,346 and U.S. Patent Publication 2021/0257729. (Note that some details, such as filtering out the optical carrier and one optical sideband, or phase locking to maintain spatial coherence, are omitted to avoid crowding the figure.) As a result, each fiber 1131_$i$ carries a modulation sideband corresponding to a particular angle-of-arrival (AoA) of the RF wave captured by the front-end phased antenna array 110. Optical fibers 1131 may correspond to waveguides 131 described herein, with such as forming part of a waveguide 131 (e.g., coupled to a second part of waveguide 131 on a PIC that terminates at star coupler 40) or forming all of a waveguide 131 (e.g., coupled to a lenslet 41-$a$ when lens 41 is used instead of a star coupler 40). Simultaneously, each fiber 1132_$i$ carries a LOOC. Optical fibers 1132 may correspond to waveguides 132 described herein, with such as forming part of a waveguide 132 (e.g., coupled to a second part of waveguide 132 on a PIC that terminates at star coupler 40) or forming all of a waveguide 132 (e.g., coupled to a lenslet 41-$a$ when lens 41 is used instead of a star coupler 40). The modulation sideband (i.e., broadband optical signal 20) in fiber 1131_$i$ and the LOOC in fiber 1132_$i$ enter a photonic integrated circuit (PIC) 2000 comprising an array of AWG 1110, each AWG 1110_$i$ being coupled to a corresponding photodiode (PD) array via its output waveguides 60 (each photodiode of the PD array being coupled to a corresponding output waveguide 60 of the AWG 1110_$i$). Each PIC-based AWG 1110 may be integrally formed with a PIC. In some examples, multiple AWGs 1110 may be formed in the same PIC. FIG. 11 illustrates a bank of PICs 2000, each comprising a PIC-based AWGs 1110 where each AWG 1110_$i$ is coupled to a corresponding fiber pair 1131_$i$+1132_$i$. Each AWG 1110_$i$ may be configured and operate as described with respect to one of the embodiments described herein and have its output provided by output waveguides 60 to respective photodiodes which convert the each of the narrow-band chunks 21_$i$ into a corresponding narrow-band RF electrical signal. Specifically, in each output waveguide 60_$i$, a corresponding OLO spectral line 30_$i$ and a corresponding narrow-band chunk 21_$i$ interfere with each other and create a combined optical signal having beat frequency at an RF frequency, that is then extracted as an RF electrical signal by a corresponding photodiode. As a result, each AWG 1110 produces a plurality of narrow-band electrical signals that may be further processed using electronic means; the number of AWG-s 1110 may equal the number of RF beams discernable by the system.

FIGS. 12A to 12C illustrate further exemplary details of the imaging receiver. A pair of lasers 121 provides two laser beams that that differ in frequency/wavelength by a set amount and are phase locked to each other. The pair of lasers 121 may be configured as a tunable optical pair source (TOPS), such as the TOPS disclosed in "Radiofrequency signal-generation system with over seven octaves of continuous tuning," authored by Schneider et al., and published in Nature Photonics, online Jan. 20, 2013, and/or as disclosed in U.S. Pat. No. 10,965,100, issued Mar. 30, 2021, the contents of each of which is hereby incorporated by reference in its entirety. One of the laser beams is provided along an optical waveguide 125 and acts as an optical carrier source for upconversion by modulators 130. The other of the laser beams is transmitted via waveguide 122 to optical frequency comb generator (OFCG) as a source for generating LOOC.

In more detail, the laser beam provided by optical waveguide 125 is split M ways by a splitter 127 and the resulting beams 128 are routed through electro-optic modulators 130 that are coupled to antennas 120 capturing the RF radiation (e.g., capturing one or more RF beams from corresponding RF sources in the real world external to the imaging receiver). The electro-optic modulators 130 upconvert the RF electrical signals received from the antennas 120 to which it is connected to an upconverted optical signal by modulating the beams 128 with the RF electrical signals. The output 135 of each modulator 130 is a modulated optical signal containing the laser carrier wavelength (corresponding to the wavelength of the laser source 125) and sidebands imprinted with the RF electrical signal provided by the corresponding antenna 120 to which the modulator 130 is connected (such RF electrical signal corresponding to the RF wave captured by that antenna 120). The outputs 135 are conveyed by optical fibers 140 to a lenslet array 150 coupled to the outputs of the fibers 140. The lenslet array 150 may be arranged in a 2D array or in a linear pattern. The optical fibers 140 and lenslet array 150 may be collectively referred to herein as a fiber/lenslet array. The lenslet array 150 is arranged at an edge 134 of the interference space 165 at which input channels 126 terminate (e.g., termination of optical fibers 140 at lenslet array 150) which may be referred to herein as a channel edge of the interference space 165.

The signal path between an antenna 120 and a corresponding lenslet of the lenslet array 150 that is operatively coupled to such antenna 120 forms a input channel 126. Ends of the plurality of input channels 126 may be linearly arranged in an order related to the 2D arrangement of the antennas 120. It should be appreciated that reference herein to linear may include curvilinear and similarly, reference herein to a line may encompass both a straight line and a curved line, unless context indicates otherwise. When the ends of the input channels 126 are arranged in a 2D arrangement, the pattern of the ends of the input channels 126 may be the same as the pattern of the 2D arrangement of the antennas 120 to which they are connected.

At the ends of the plurality of input channels 126 (the outputs of the optical fibers 140 at the lenslet array 150), the optical signals output by each optical fiber 140 propagate in interference space 165 (e.g., free space, a slab waveguide, etc.). As such, these optical signals are no longer guided by the optical fibers 140 and may thus interfere with each other and form one or more optical beams 185 in the interference space 165.

Each such formed optical beam 185 corresponds to an RF beam captured by the antenna array 110. The optical beams 185 are spatially separated in the interference space 165 and are focused at spatially separated locations at the beamspace edge 136 on pickup array 700 to be captured by corresponding pickups of the pickup array 700 and transmitted to the AWG array 1111. Specifically, upon transmission of the modulated optical signals (outputs 135 of modulators 130) into the interference space 165, each optical beam 185 may have the form of a plane wave with a direction of propagation determined by the corresponding RF beam (captured by the antenna array 110) to which it corresponds. The optical beams 185 formed in the interference space 165 may be subject to various optical devices 180 (e.g., lenses, filters, beam splitters, beam combiners, etc.). For example, optics 180 may include a one or more lenses 111 that focus the optical beams 185 formed in the interference space 165 to produce one or more spatially separated optical beams 185. The spatially separated optical beams 185 may be focused on a beamspace edge 136 of the interference space 165 (which may correspond to a focal plane or an image plane of the optical processor 1000) and captured by a pickup array 700, such an array of lenslets 170 coupled to optical fibers 1131.

The number of pickups of the pickup array 700 may correspond to the number of RF beams discernable by the optical processor 1000. In the present example, L pickups are provided (L lenslet 170/fiber 1131 pairs) to capture and transmit L optical beams 185 to L AWGs 1110 of AWG array 1111. Each of the optical beams 185 comprises a broadband optical signal 20 as described herein. L LOOCs are also provided to the L AWGs 1110 such that each AWG 1110 receives inputs of a respective one of the L optical beams and a respective one of the L LOOCs.

The optical outputs 135 of the modulators 130 may be filtered with a filter 112 to allow only a single modulation sideband corresponding to the captured RF radiation to pass (using filter 112 in each of the input channels 126 or in the interference space 165, e.g.). The filter 112 may be part of optics 180 in the interference space 165 optically downstream of the lenslet array 150. In alternative embodiments, the filter 112 can be placed anywhere between the modulators 130 and the photodiodes. Furthermore, in some embodiments, especially for frequencies lower than ~5 GHz, a Mach-Zehnder modulator (MZM) may be used for filter 112 to filter out the sideband energy from the optical carrier energy. Such modulators can, under appropriate bias conditions, interferometrically suppress the carrier while passing the (odd-ordered) sidebands, thereby suppressing the carrier in a frequency-independent manner.

Inputs of the pickups of pickup array 700 may be arranged in two dimensions or linearly arranged at the beamspace edge 136 of interference space 165. Each pickup of the pickup array 700 may comprise a lenslet 170/optical fiber 1131 pair. Each formed optical beam 185 may thus be captured by a corresponding one of the pickups of pickup array 700 at the beamspace edge 136 (e.g., at a focal plane of the optical processor 1000) and transmitted by a corresponding optical fiber 1131 to an AWG 1110 of an AWG array 1111. An optical fiber 1131 is provided with each pickup of the pickup array 700, and each of the L optical fiber 1131 (represented by the wide arrow in FIG. 12B) are connected to a corresponding AWG 1110 of the AWG array 1111 to carry and transmit the corresponding captured optical beam 185 (comprising the optical broadband signal 20) to the corresponding AWG 1110. Each AWG 1110 of the AWG array 1111 may have a structure and operation as described elsewhere herein to separate the optical broadband signal 20 (185) into a plurality narrowband chunks 20_i which are combined with a corresponding one of the OLO spectral lines 30 of the LOOC in a corresponding one of the output waveguides 60 of the AWG 1110. It will be appreciated that each AWG 1110 of the AWG array 1111 has a plurality output waveguides 60 and thus L×M output waveguides 60 may be provided with the AWG array 1111.

Also shown in FIG. 12B, a plurality (L) of optical fibers 1132 (corresponding to input waveguides 132), each transmitting a LOOC, are provided to the AWG array 1111. Thus, each AWG 1110 of the AWG array 1111 has a signal input of a captured optical beam 185 as its optical broadband signal 20 (provided by one of the L optical fibers 1131) and a signal input of an LOOC provided by one of the L fibers 1132. These two signal inputs to an AWG 1110 may be combined with a combiner (not shown) and provided to star coupler 40 of the AWG 1110 on a single waveguide (e.g., 133 as in the embodiment of FIG. 7) or may be separately provided to star coupler 40 of the AWG 1110 via spaced apart waveguides 131 and 132 as in the embodiments of FIGS. 1 and 5.

FIG. 12B also illustrates exemplary details of the generation of the LOOC. As noted, the tunable optical pair source (TOPS) includes a pair of lasers that provide two laser beams that that differ in frequency/wavelength by a set amount and are phase locked to each other. One of the laser beams is transmitted along an optical waveguide 125 (e.g., optical fiber) and acts as an optical carrier source for upconversion by modulators 130. The other of the laser beams is transmitted by optical waveguide 122 (e.g., an optical fiber) to an optical frequency comb generator (OFCG) which uses this second laser beam as a source for generating the LOOC. The optical frequency comb generator (OFCG) may be conventional. For example, the OFCG may comprise an electro-optic modulator that modulates the second laser beam provided by waveguide 122 with an RF signal, such as an RF comb. One of the resulting optical sidebands of the modulated signal from the electro-optic modulator may be extracted via an optical filter to provide the LOOC. The LOOC is transmitted by optical waveguide 123 (e.g., an optical fiber) to splitter 124 which splits the LOOC L ways and transmits the split LOOC signals to the AWG array 1111 along each of L optical fibers 1132.

The OLO spectral lines 30 of the LOOC are thus phased locked and mutually coherent with each other and the second laser beam input to the OLO. As the first and second laser beams generated by the TOPS are also phased locked and mutually coherent with each other, the OLO spectral lines 30 are thus mutually coherent with and phased locked with the optical beams 128. As the optical beams 128 provide the optical carriers for the upconversion of the RF electrical signals by the electro-optic modulators 135, such coherence/phase locking between the optical beams 128 and the OLO spectral lines 30 preserves and allows the extraction of the information carried by the RF electrical signals provided to the electro-optic modulators when the narrowband chunks are downconverted back to IF (intermediate frequency) electrical signals by the photodiodes.

FIG. 12C illustrates further exemplary details of downstream processing of the imaging receiver. As noted, the AWG array 1111 comprises L AWG 1110 each having N output waveguides 60 that provide N outputs 160_i for each of the N channels of the AWG. L×N output waveguides 60 transmit the L×N outputs 160_i of the AWG array 1111 to an L×N array of photodiodes 1200, where each photodiode downconverts a corresponding optical signal output 160_i to a corresponding IF electrical signal as described elsewhere herein.

Thus, L optical beams 185, each corresponding to an RF beam received by the antenna array 110, may be simultaneously downconverted to an IF form. Specifically, each optical beam 185 may comprise a broadband optical signal 20 that is separated into N narrowband chunks 20_i, each of which is combined with an OLO spectral line 30_i in a corresponding output waveguide 60_i and then converted into an IF analog electrical signal by a photodiode of the PD array 1200. An optical beam 185 may thus be downconverted into NIF analog electrical signals, each of which represents a downconverted portion of the optical beam 185 and together carry all the information of the RF beam to which the optical beam 185 corresponds.

L×N IF analog electrical signals may be transmitted by L×N IF transmission lines 61 to ADC array 1300 comprising an array of L×N analog to digital converters (ADCs), each of which converts a corresponding one of the L×N IF analog electrical signals from its analog form to its digital form (i.e., digital data).

The data is output by the ADC array 1300 to processor 1400 by bus 62. Thus, the IF signals extracted by the photodiodes of the PD array 1200 may be provided to processor 1400 after being converted to digital form by the ADC array 1300. Processor 1400 may be a general purpose processor (e.g., a computer, microprocessor, CPU, GPU, etc.) or special purpose processor (e.g., a digital signal processor), and may be hardware configured by software or hardware circuitry (e.g., an integrated circuit). Processor 1400 may be formed of by one processor or several interconnected processors. Processor 1400 may determine the RF beam angle of arrival (at the antenna array 110) based upon the pickup of pickup array 700 that provides the IF signals to the processor 1400. Specifically, the optical processor 1000 may be configured such that a predetermined relationship exists between the location of an optical beam 185 as focused on the pickup array 700 at the beamspace edge 136 (e.g., a focal plane of the optical processor 1000 and the angle of arrival of the RF beam at the antenna array 110 to thus allow the processor 1400 to determine the angle of arrival of the RF beam at the antenna array 110. Thus, a location of an optical beam 185 at the beamspace edge 136 (e.g., formed as a discrete spot) at the pickup array 700 may be used to determine the angle of arrival of the RF beam by the processor 1400.

The processor 1400 may also extract non-spatial information provided by an RF beam and encoded into corresponding optical beam 185 and extracted as RF signals by the photodiode array 1200. A few examples of non-spatial information encoded into RF signals that may be extracted include amplitude, phase, and/or frequency modulation of an RF carrier with an information-bearing signal. The information-bearing modulating signal may be analog or digital. The information may be contained in frequency-division multiplexed, time-division multiplexed, or code division multiple access signals (FDM, TDM or CDMA respectively; using telecommunication examples for more specificity for each, e.g., OFDM, GSM, or WCDMA signals).

For example, an RF beam captured by the antenna array 110 may provide an OFDM signal comprising multiple carrier signals that are orthogonal to each other. An AWG 1110 may receive the OFDM signal as a plurality of narrowband chunks 20, each corresponding to a different carrier signal. As such, each carrier (corresponding to a narrowband chunk 20_i) may be separated from one another by the AWG 1110 and at the same time, combined with a corresponding OLO spectral line 30_i in an output waveguide 60_i of the AWG 1110. The carriers, thus separated, may be separately and simultaneously downconverted to corresponding RF electrical signals via corresponding photodiodes of PD array 1200 as described herein (and continued to be separately and simultaneously processed by the ADC array 1300 and processor 1400).

For example, each OFDM signal received PD array 1200 may comprise multiple channels of data, each associated with a different transmission (e.g., each associated with a different audio signal or different video signal). As is known, a channel of digital data need not be carried by a single carrier but may be spread across multiple ones of these carriers (e.g., via frequency hopping or interleaving). The RF carriers of the same frequency (e.g., of the OFDM signals) may be simultaneously transmitted by different RF sources and captured by different pickups of pickup array 700; interference amongst the simultaneously received OFDM signals may be avoided due to the spatial separation of the resulting optical beams 185 at beamspace edge 36. Each OFDM signal received by the PD array 1200 may correspond to an OFDM RF signal transmitted by one or more of the RF sources and received by antennas 120 (e.g., in the millimeter wavelength RF range, or in a range of 3 to 300 GHz, or between 0.5 to 300 GHz, such as 0.5-110 GHz, or in the HF band of 3 to 30 MHz, or in VHF band of 30 to 300 MHz, or in UHF band of 300 MHz to 1 GHz).

Thus, for example, antennas 120 may receive multiple OFDM RF signals (via corresponding RF beams) each having multiple channels to carry multiple transmissions of digital data on multiple signal carriers, such as digital audio (e.g., MP3, MPEG), digital images, digital video (e.g., MP4), data in TCP/IP format, etc. Optical conversion and processing (as described herein) may convert each of these RF OFDM signals to a corresponding one of optical signals 185 at the beamspace edge 36 to a different one of the pickups of pickup array 700. Thus, even when implemented with the same carrier frequency, different RF beams from different RF sources may be simultaneously captured by the antenna array 110 and simultaneously processed by the optical processor 1000 and processor 1400. Thus, a plurality of RF beams received at the antenna array 110 and their corresponding information encoded therein can be processed simultaneously to extract or recover this information.

Figure 13:
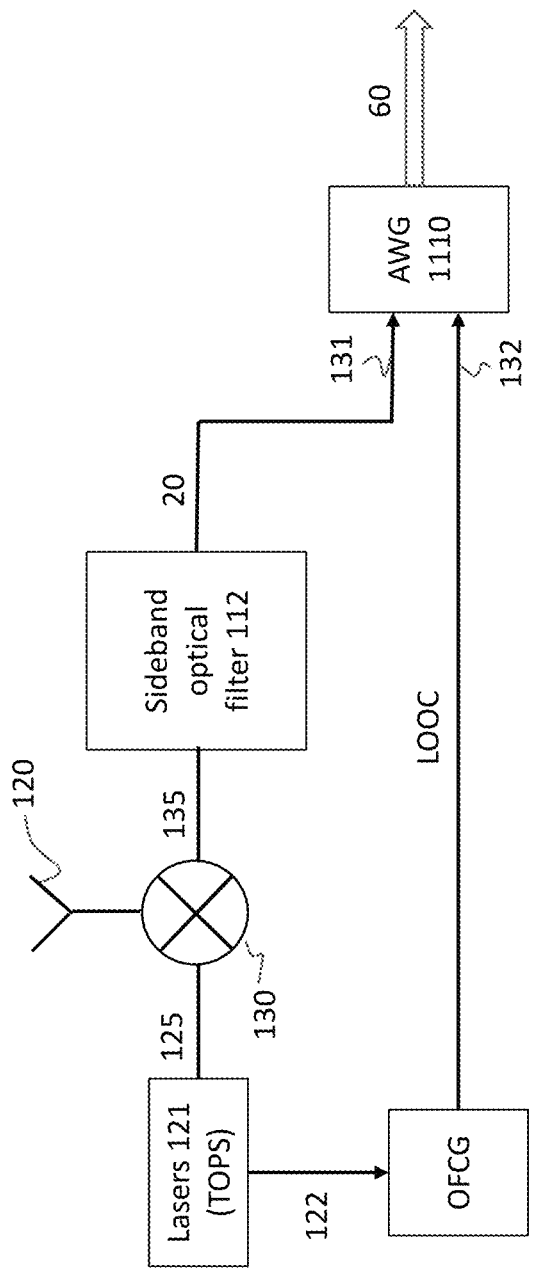
FIG. 13 illustrates a receiver embodiment of the invention.

FIG. 13 illustrates another embodiment of the invention that may implement the structure and/or operation of the AWG 1110 described elsewhere herein to form a receiver. As shown in FIG. 13, the AWG 1110 may be paired with a single input channel 126 from a single antenna 120. Specifically, antenna 120 may generate an RF electrical signal in response to capturing RF radiation of an RF beam and provide the RF electrical signal to electro-optic modulator 130. The RF electrical signal may be upconverted to an optical signal 135 by modulating a first laser beam (provided by one of the lasers via waveguide 125) that acts as an optical carrier signal. The upconverted optical signal may comprise the optical carrier signal and modulation sidebands resulting from the upconversion of the RF electrical signal. Each modulation sideband may preserve information carried by the RF electrical signal/RF beam. An optical filter 112 may pass one of the modulation sidebands and filter out (block or attenuate) the other modulation sideband and the optical carrier signal. The modulation sideband may thus form the broadband optical signal 20 which is provided as an input to AWG 1110 via optical fiber 1131.

The AWG 1110 may also receive an LOOC via waveguide 132 (e.g., an optical fiber) as a second input to the AWG 1110, such as described with respect to FIGS. 1 and 5. Alternatively, the LOOC and broadband optical signal 20 may be combined by a combiner (not shown) and provided to the AWG 1110 along a single input, such as via waveguide 133 as described with respect to the embodiment of FIG. 7. The LOOC may be generated by the OFCG using the second laser beam of lasers 121 as described elsewhere herein. The modulation sideband/broadband optical signal 20 may thus be separated into N narrowband chunks 20_i that are combined with corresponding OLO spectral lines 30_i in a corresponding one of the output waveguides 60_i as described herein. The AWG output may be provided by the optical waveguides and processed as described with respect to FIG. 12C and/or elsewhere herein, including conversion to RF analog RF signals by PD array 1200, subsequent conversion to digital data by ADC array 1300 which is then processed by processor 1400.

The system of FIG. 13 may comprise a radiometer that detects atmospheric RF emissions of interest, such as infrared and microwave RF frequencies in the GHz range (e.g., from 300 MHz-500 GHz and beyond). The RF emission, or the related sky brightness temperature, near various spectral absorption lines is a strong function of atmospheric conditions, such as temperature and moisture. Much can be discerned about the atmosphere, ground cover, and ocean surface by monitoring these signals. The raw sensor data are collected at a number of discrete frequencies from which many useful data products are retrieved, commonly using neural networks. Besides the atmospheric temperature and moisture profile, additional data products include precipitation rate, land surface emissivity, snow cover, sea ice concentration, land surface temperature, cloud liquid water, and more. The radiometer may adopt structure and operation of the radiometer disclosed in U.S. Pat. No. 10,917,178 (herein incorporated by reference in its entirety) as modified to include the AWG 1110 with its LOOC and broadband signal inputs 20 as described herein.

The foregoing is illustrative of exemplary embodiments and is not to be construed as limiting thereof. Although a few exemplary embodiments have been described, those skilled in the art will readily appreciate that many modifications are possible without materially departing from the novel teachings and advantages of the inventive concepts. Accordingly, all such modifications are intended to be included within the scope of the present invention as defined in the claims.

The invention claimed is:

1. A method of processing a signal comprising:
providing an optical broadband signal having a frequency bandwidth of a first size to a first input of a first optical device, the optical broadband signal comprising a plurality of narrowband chunks that comprise optical signals having frequency bandwidths of different portions of the frequency bandwidth of the optical broadband signal;
providing a local oscillator optical comb (LOOC) to a second input of the first optical device, the LOOC comprising a plurality of optical local oscillator (OLO) spectral lines at different frequencies from one another;
with the first optical device, capturing the optical broadband signal and the LOOC at P outputs of the first optical device, where P is an integer greater than one;
with each of P waveguides of an arrayed waveguide grating, transmitting the optical broadband signal and the LOOC to P inputs of a second optical device;
with the second optical device, spatially separating the plurality of narrowband chunks to be captured by separate ones of N outputs of the second optical device, where N is an integer greater than 1, and spatially separating N OLO spectral lines to be captured by separate ones of the N outputs, such that each of the N outputs captures a corresponding pair of one of the narrowband chunks and one of the OLO spectral lines;
for each of the N pairs of a narrowband chunk and an OLO spectral line captured by the N outputs of the second optical device, downconverting the spectral chunk using the corresponding OLO spectral line as an optical local oscillator for the downconversion.

2. The method of claim 1, wherein the first optical device is a first star coupler and the second optical device is a second star coupler including the N outputs.

3. The method of claim 1,
wherein the arrayed waveguide grating introduces linear phase offsets of different degrees for the different narrowband chunks, and
wherein the different degrees of linear phase offset of the narrowband chunks separates the narrowband chunks to the N outputs of the second star coupler.

4. The method of claim 3, wherein each of the N outputs of the second star coupler is a waveguide having a fan in configuration that comprises a relatively wide portion at a propagation space of the second star coupler that tapers to a relatively narrow portion of the waveguide.

5. The method of claim 1, wherein each of the N outputs of the second optical device is a waveguide to provide N output waveguides of the second optical device.

6. The method of claim 5, wherein in each waveguide of the N output waveguides, the corresponding pair of a narrowband chunk and an OLO spectral line captured by the waveguide interfere with each other and create a corresponding combined optical signal having a beat frequency at an RF frequency.

7. The method of claim 1, wherein in each of the N outputs of the second optical device, the corresponding pair of a narrowband chunk and an OLO spectral line captured by the output interfere with each other to create a corresponding combined optical signal having a beat frequency at an RF frequency.

8. The method of claim 1, wherein each of the N outputs of the second optical device is a lenslet coupled to a corresponding waveguide.

9. The method of claim 1, wherein the N OLO spectral lines are mutually coherent and phase locked with each other.

10. The method of claim 1, further comprising forming the optical broadband signal by modulating an optical carrier signal with an electro-optic modulator,
wherein the N OLO spectral lines are mutually coherent and phase locked with the optical carrier.

11. The method of claim 10, further comprising:
generating first and second laser beams that differ in frequency by a set amount and are phased locked with each other, wherein the first laser beam is the optical carrier signal;
forming the N OLO spectral lines using an optical frequency comb generator using the second laser beam as a source.

12. The method of claim 1, wherein for each of the N pairs of a narrowband chunk and an OLO spectral line captured by the N outputs of the second optical device, the frequency of the OLO spectral line is offset from the center frequency of the narrowband chunk.

13. The method of claim 1, wherein for each of the N pairs of a narrowband chunk and an OLO spectral line captured by the N outputs of the second optical device, the OLO spectral line is spatially separate from the narrowband chunk and does not overlap in frequency with that of the narrowband chunk.

14. The method of claim 1, further comprising shifting the LOOC spectrum.

* * * * *